US010304365B2

(12) United States Patent
Matsui

(10) Patent No.: US 10,304,365 B2
(45) Date of Patent: May 28, 2019

(54) IMAGE CORRECTION DEVICE, DISPLAY DEVICE, AND IMAGE CORRECTION METHOD

(71) Applicant: NEC Display Solutions, Ltd., Tokyo (JP)

(72) Inventor: Katsuyuki Matsui, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 194 days.

(21) Appl. No.: 15/304,454

(22) PCT Filed: May 16, 2014

(86) PCT No.: PCT/JP2014/063062
§ 371 (c)(1),
(2) Date: Oct. 14, 2016

(87) PCT Pub. No.: WO2015/173948
PCT Pub. Date: Nov. 19, 2015

(65) Prior Publication Data
US 2017/0039912 A1 Feb. 9, 2017

(51) Int. Cl.
*G09G 3/00* (2006.01)
*G09G 3/20* (2006.01)
(Continued)

(52) U.S. Cl.
CPC ............. *G09G 3/006* (2013.01); *G09G 3/20* (2013.01); *G09G 3/3406* (2013.01); *G09G 3/36* (2013.01);
(Continued)

(58) Field of Classification Search
CPC ................. G09G 3/3406; G09G 5/32; G09G 2320/0626; G09G 3/3611;
(Continued)

(56) References Cited

U.S. PATENT DOCUMENTS

| | | | |
|---|---|---|---|
| 6,781,595 B2 * | 8/2004 | Kobayashi | H04N 1/6005 345/589 |
| 2005/0035982 A1 * | 2/2005 | Hong | G09G 3/2092 345/698 |

(Continued)

FOREIGN PATENT DOCUMENTS

| | | |
|---|---|---|
| JP | H 05-35210 A | 2/1993 |
| JP | 2007-219062 A | 8/2007 |

(Continued)

OTHER PUBLICATIONS

International Search Report (ISR) (PCT Form PCT/ISA/210), in PCT/JP2014/063062, dated Aug. 12, 2014.

*Primary Examiner* — Bryan Earles
(74) *Attorney, Agent, or Firm* — McGinn I.P. Law Group, PLLC.

(57) ABSTRACT

An image correction device includes: a first target unevenness characteristic calculation unit that calculates a first target unevenness characteristic based on a first uncorrected unevenness characteristic and a correction amount, the first uncorrected unevenness characteristic being an uncorrected unevenness characteristic at a first gradation, the uncorrected unevenness characteristic being a characteristic of brightness unevenness of a display panel when uncorrected, the correction amount being calculated based on a backlight drive value and a black level; a second target unevenness characteristic calculation unit that calculates a second target unevenness characteristic based on a second uncorrected unevenness characteristic and the backlight drive value, the second uncorrected unevenness characteristic being the uncorrected unevenness characteristic at a second gradation; and a correction data generation unit that generates correction data for each gradation for correcting an image signal, based on the first and second uncorrected unevenness char- (Continued)

acteristics and the first and second target unevenness characteristics.

20 Claims, 12 Drawing Sheets

(51) Int. Cl.
  *G09G 3/36* (2006.01)
  *G09G 3/34* (2006.01)
  *G06T 11/60* (2006.01)
(52) U.S. Cl.
  CPC ............ *G09G 3/3611* (2013.01); *G06T 11/60* (2013.01); *G09G 2320/0233* (2013.01); *G09G 2320/0238* (2013.01); *G09G 2320/0242* (2013.01); *G09G 2320/0285* (2013.01); *G09G 2380/08* (2013.01)
(58) Field of Classification Search
  CPC ... G09G 2320/0233; G09G 2320/0238; G09G 2320/0285; G09G 2380/08; G09G 3/006; G09G 3/20; G09G 3/36; G09G 2320/0242; G09G 3/002; G09G 2320/0276; G09G 2320/0666; G09G 2320/0693; G09G 2360/147; G09G 3/3426; G09G 2320/0646; G06T 11/60; G06T 5/008; G06T 5/50; G06T 2207/10024

See application file for complete search history.

(56) References Cited

U.S. PATENT DOCUMENTS

| | | | |
|---|---|---|---|
| 2013/0016081 A1* | 1/2013 | Park | G09G 3/006 345/207 |
| 2013/0182019 A1* | 7/2013 | Kato | G09G 5/06 345/690 |
| 2015/0035870 A1* | 2/2015 | Ooya | G02F 1/133611 345/690 |
| 2015/0325178 A1* | 11/2015 | Nagashima | G09G 3/34 345/590 |

FOREIGN PATENT DOCUMENTS

| | | |
|---|---|---|
| JP | 2009-128733 A | 6/2009 |
| WO | WO 2011/121630 A1 | 10/2011 |

* cited by examiner

IMAGE CORRECTION DEVICE, DISPLAY DEVICE, AND IMAGE CORRECTION METHOD

TECHNICAL FIELD

The present invention relates to an image correction device, a display device, and an image correction method.

BACKGROUND ART

Numerically accurate color reproduction is required for a display device used for medical applications and graphic design. Display devices having a backlight perform adjustment of the white level by adjusting the brightness of the backlight, and perform adjustment of the black level by adjusting the offset of an image signal. Target values of the black level and the white level are set by a user.

Moreover, in a display device that has an image display unit and a backlight, and that corrects brightness unevenness and chromatic unevenness (hereinafter referred to as display unevenness), there has been proposed a display device that can set a correction amount of the display unevenness, and the display unevenness is corrected by using the correction amount of the display unevenness (for example, refer to Patent Document 1).

Prior Art Documents

[Patent Document]
[Patent Document 1] Japanese Unexamined Patent Application, First Publication No. 2007-219062

SUMMARY OF INVENTION

Problem to be Solved by the Invention

However, the black level, the white level, and the correction amount of the display unevenness that are set by the user correlate with each other. Therefore, in the invention described in Patent Document 1, if the correction amount of the display unevenness is changed after determination of the white level and the black level, the white level and the black level vary. Therefore, in order to acquire a well balanced setting, the user needs to adjust iteratively the setting of the white level, the setting of the black level, and the setting of the correction amount of the display unevenness. Moreover, in the invention described in Patent Document 1, if the white level and the black lever are changed after determination of the correction amount of the display unevenness, correction is performed by the correction amount of the display unevenness, and hence, a range that can change the white level and the black level becomes narrow. Therefore, the user needs to adjust the setting of the white level, the setting of the black level, and the setting of the correction amount of the display unevenness iteratively in order to acquire a well balanced setting.

Thus, according to the invention described in Patent Document 1, it has been difficult to determine a well-balanced set value. Therefore it has been difficult to correct the display unevenness in accordance with the preference of the user.

The present invention has been conceived in view of the above problems, and an exemplary object thereof is to provide an image correction device, a display device, and an image correction method that can correct the display unevenness in accordance with the preference of the user.

Means for Solving the Problem

In order to achieve the above object, an image correction device according to the present invention includes: a first target unevenness characteristic calculation unit that calculates a first target unevenness characteristic based on a first uncorrected unevenness characteristic and a correction amount, the first uncorrected unevenness characteristic being an uncorrected unevenness characteristic at a first gradation, the uncorrected unevenness characteristic being a characteristic of brightness unevenness of a display panel when uncorrected, the correction amount being calculated based on a backlight drive value and a black level; a second target unevenness characteristic calculation unit that calculates a second target unevenness characteristic based on a second uncorrected unevenness characteristic and the backlight drive value, the second uncorrected unevenness characteristic being the uncorrected unevenness characteristic at a second gradation different from the first gradation; and a correction data generation unit that generates correction data for each gradation for correcting an image signal, based on the first uncorrected unevenness characteristic, the second uncorrected unevenness characteristic, the first target unevenness characteristic, and the second target unevenness characteristic.

In order to achieve the above object, a display device according to the present invention includes: a display panel that displays an image; a first target unevenness characteristic calculation unit that calculates a first target unevenness characteristic based on a first uncorrected unevenness characteristic and a correction amount, the first uncorrected unevenness characteristic being an uncorrected unevenness characteristic at a first gradation, the uncorrected unevenness characteristic being a characteristic of brightness unevenness of the display panel when uncorrected, the correction amount being calculated based on a backlight drive value and a black level; a second target unevenness characteristic calculation unit that calculates a second target unevenness characteristic based on a second uncorrected unevenness characteristic and the backlight drive value, the second uncorrected unevenness characteristic being the uncorrected unevenness characteristic at a second gradation different from the first gradation; and a correction data generation unit that generates correction data for each gradation for correcting an image signal, based on the first uncorrected unevenness characteristic, the second uncorrected unevenness characteristic, the first target unevenness characteristic, and the second target unevenness characteristic.

In order to achieve the above object, an image correction method according to the present invention includes: a first target unevenness characteristic calculation step of calculating a first target unevenness characteristic based on a first uncorrected unevenness characteristic and a correction amount, the first uncorrected unevenness characteristic being an uncorrected unevenness characteristic at a first gradation, the uncorrected unevenness characteristic being a characteristic of brightness unevenness of a display panel when uncorrected, the correction amount being calculated based on a backlight drive value and a black level; a second target unevenness characteristic calculation step of calculating a second target unevenness characteristic based on a second uncorrected unevenness characteristic and the backlight drive value, the second uncorrected unevenness characteristic being the uncorrected unevenness characteristic at a second gradation different from the first gradation; and a correction data generation step of generating correction data for each gradation for correcting an image signal, based on the first uncorrected unevenness characteristic, the second uncorrected unevenness characteristic, the first target unevenness characteristic, and the second target unevenness characteristic.

Effect of the Invention

According to the present invention, display unevenness can be corrected in accordance with the preference of the user.

EXEMPLARY EMBODIMENTS FOR CARRYING OUT THE INVENTION

Hereunder, exemplary embodiments of the present invention are described in detail with reference to the drawings.

First Exemplary Embodiment

Figure 1:
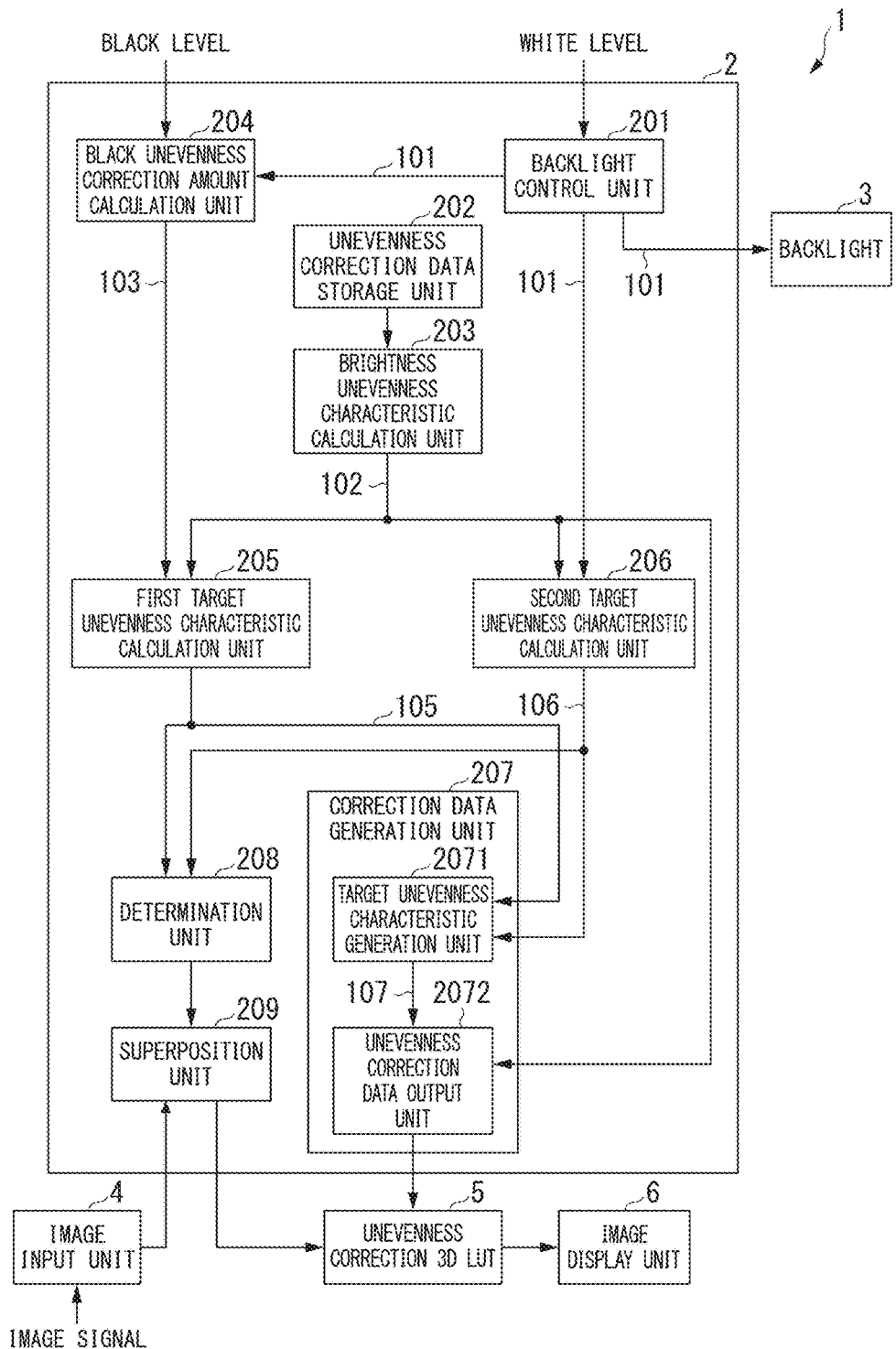
FIG. 1 is a schematic configuration diagram of a display system according to a first exemplary embodiment.

FIG. 1 is a schematic configuration diagram of a display system 1 according to the present exemplary embodiment.

As shown in FIG. 1, the display system 1 is configured to include an image correction device 2, a backlight 3, an image input unit 4, an unevenness correction 3D LUT 5, and an image display unit 6.

The backlight 3 is a light source that emits light according to a drive signal output by the image correction device 2.

The backlight 3 is, for example, a white LED (light-emitting diode), a three-color LED, a cold-cathode tube (CCFL), a hot-cathode fluorescent light (HCFL), or an electroluminescence panel (ELP).

The image input unit 4 outputs an image signal input from an image output device such as a PC (personal computer) to the image correction device 2. The image signal to be input is, for example, an image signal in accordance with the DVI (Digital Visual Interface) specification, an image signal in accordance with the HDMI (registered trademark; High-Definition Multimedia Interface) specification, or an image signal in accordance with the VGA (Video Graphics Array) specification. The image signal to be input may be an analog signal.

In the unevenness correction 3D LUT 5, a 3D LUT (three-dimensional lookup table) is set by the image correction device 2. The unevenness correction 3D LUT 5 corrects the image signal input from the image correction device 2 by using the set 3D LUT, and displays the corrected image signal on the image display unit 6. An unevenness correction value stored in an unevenness correction data storage unit 202 is set in the unevenness correction 3D LUT 5 as an initial value. The correction value is an independent value for each color (for example, R, G, and B), for each gradation (for example, 255, 192, 128, 64, and 0), and for each position (for example, point 20 on the y axis, point 11 on the x axis). In the image display unit 6, the y axis is a long direction, and the x axis is a short direction.

The image display unit 6 displays the image signal output from the unevenness correction 3D LUT 5. The image display unit 6 is, for example, a liquid crystal panel. A display element mounted on the image display unit 6 may be a display element other than a liquid crystal display element, for example, an organic electroluminescence display element, an inorganic electroluminescence display element, a PALC (Plasma Address Liquid Crystal), a PDP (Plasma Display Panel), or an FED (Field Emission Display).

The image correction device 2 includes a backlight control unit 201, the unevenness correction data storage unit 202, a brightness unevenness characteristic calculation unit 203, a black unevenness correction amount calculation unit 204, a first target unevenness characteristic calculation unit 205, a second target unevenness characteristic calculation unit 206, a correction data generation unit 207, a determination unit 208, and a superposition unit 209.

A value indicating the white level is input to the backlight control unit 201. The backlight control unit 201 generates a backlight drive value 101, which is proportional to the input value indicating the white level. The backlight control unit 201 outputs the generated backlight drive value 101 to the backlight 3, the black unevenness correction amount calculation unit 204, and the second target unevenness characteristic calculation unit 206. The value indicating the white level is, for example, brightness [cd (candela)/m$^2$] of white to be displayed on the image display unit 6, and is a value set by a user or an initial value set in the display system 1 beforehand. The value indicating the white level is, for example, 200 [cd/m$^2$]. The backlight drive value is, for example, a current value or a value of duty ratio of the pulse.

Unevenness correction data for each gradation set beforehand is stored in the unevenness correction data storage unit 202. When the gradation is 256, for example, pieces of unevenness correction data for each gradation of 0, 64, 128, 192, and 255 are stored in the unevenness correction data storage unit 202. For example, the 0 gradation corresponds to black, and the 255 gradation corresponds to white. The gradation may be 12 bits or 16 bits. Moreover, the unevenness correction data is a gradation correction value at each point in the image display unit 6 decided so as to have the same screen unevenness characteristics in all the display gradations, for example, based on two-dimensional distribution (unevenness characteristics) obtained by an image pickup device (not shown) at the time of manufacturing the display system 1. Furthermore, in the present exemplary embodiment, a state in which correction is performed so that the screen unevenness characteristic becomes the same in the display gradation is referred to as a state with an unevenness correction amount being 100%, and a state in which the correction is not performed is referred to as a state with an unevenness correction amount being 0%. Thus, the unevenness correction amount is a parameter indicating how much the unevenness characteristic is corrected. The unevenness correction amount is input, for example, via a user interface.

Here, the reason why the unevenness correction data is the gradation correction value at each point in the image display unit 6, which is decided so as to give the same screen unevenness characteristics in all the display gradations, is described.

At the time of unevenness adjustment, the unevenness characteristic on a white screen may be freely set. However, it is desired that an unevenness characteristic equal to or lower than an intermediate gradation is set to be the same as the unevenness characteristic on the white screen. If it is not performed and the unevenness characteristic for each gradation is changed, then if gamma curves on the screen are not lined up, color unevenness may occur at the time of displaying a light color, or display quality standards (medical DICOM) may not be satisfied.

Figure 2:
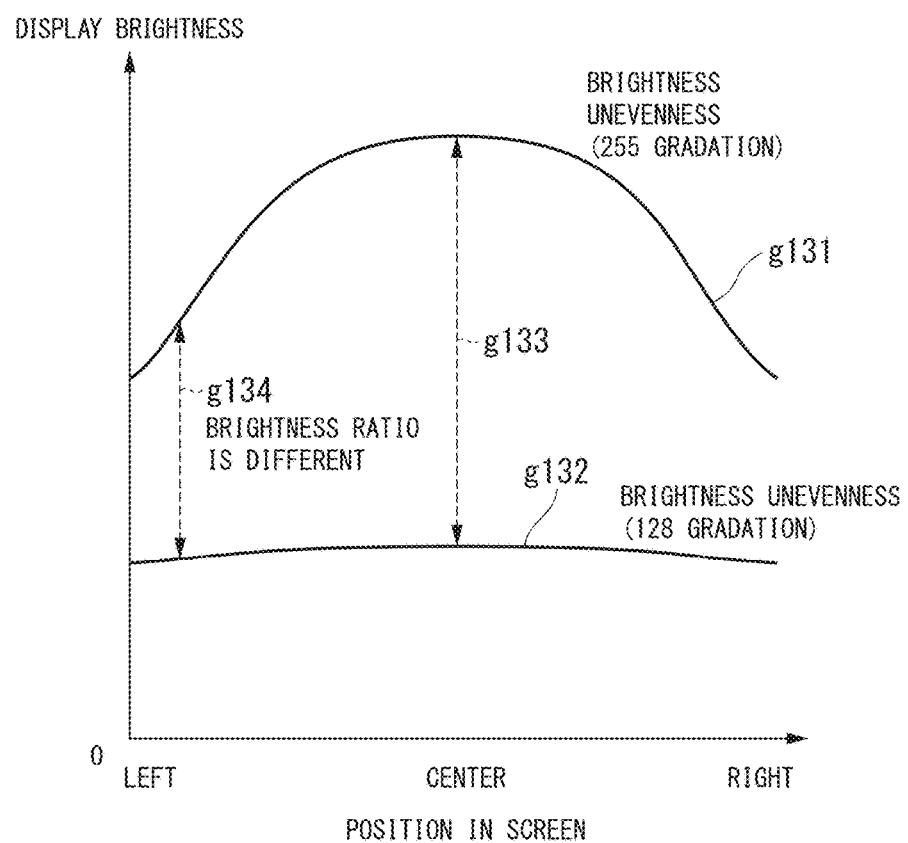
FIG. 2 is a diagram for explaining an example in which screen unevenness characteristics are different from each other for each gradation.

For example, in the case where pink (R255, G128, and B128) color is displayed on the whole screen of a display having the unevenness characteristic different for each gradation, then as shown in FIG. 2, color unevenness occurs such that the center of the screen becomes reddish and the left and right ends become greyish. FIG. 2 is a diagram for explaining an example in which the screen unevenness characteristics are different for each gradation. In FIG. 2, the horizontal axis represents a position on the screen of the image display unit 6, and the vertical axis represents display brightness. The curve g131 indicates brightness unevenness in the 255 gradation, and the curve g132 indicates brightness unevenness in the 158 gradation. Moreover, the arrow g133 indicates a brightness difference between the 255 gradation and the 128 gradation at the center of the screen, and the arrow g134 indicates a brightness difference between the 255 gradation and the 128 gradation on the left side of the screen.

As shown in FIG. 2, the reason why color unevenness occurs depending on the position on the screen is that the R (red) brightness ratio to G (green) and B (blue) brightness changes at each screen position. To suppress this, in the present exemplary embodiment, it is controlled so that all gradations are adjusted to the same unevenness characteristics. In the present exemplary embodiment, there is a match between the unevenness characteristic in the 0 gradation and the unevenness characteristic in the 255 gradation. Therefore, as described later, the unevenness characteristics become the same even in the gradations therebetween, which are generated by interpolation.

Figure 3:
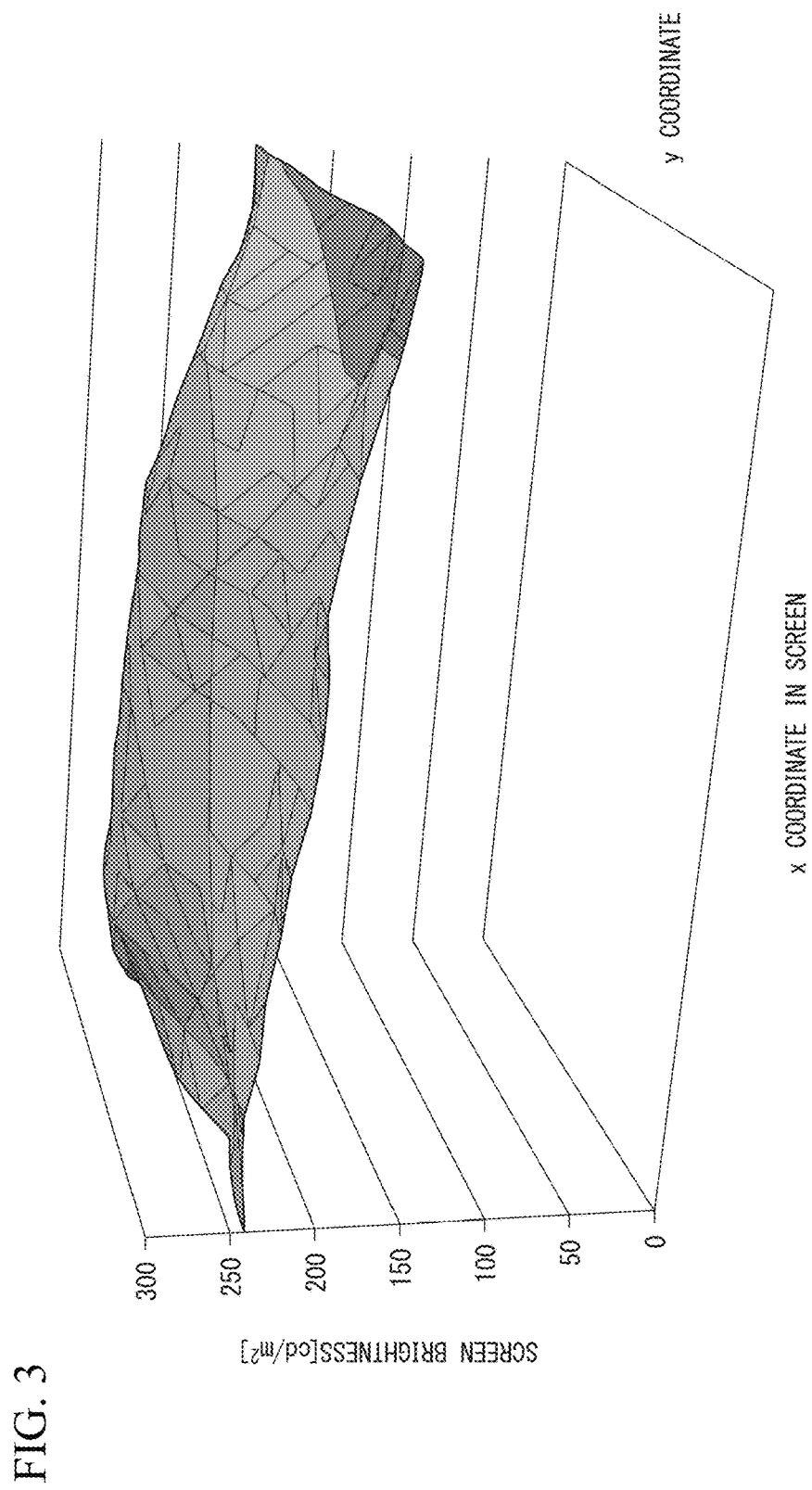
FIG. 3 is a diagram for explaining an example of a white unevenness characteristic of an image display unit according to the first exemplary embodiment.
Figure 4:
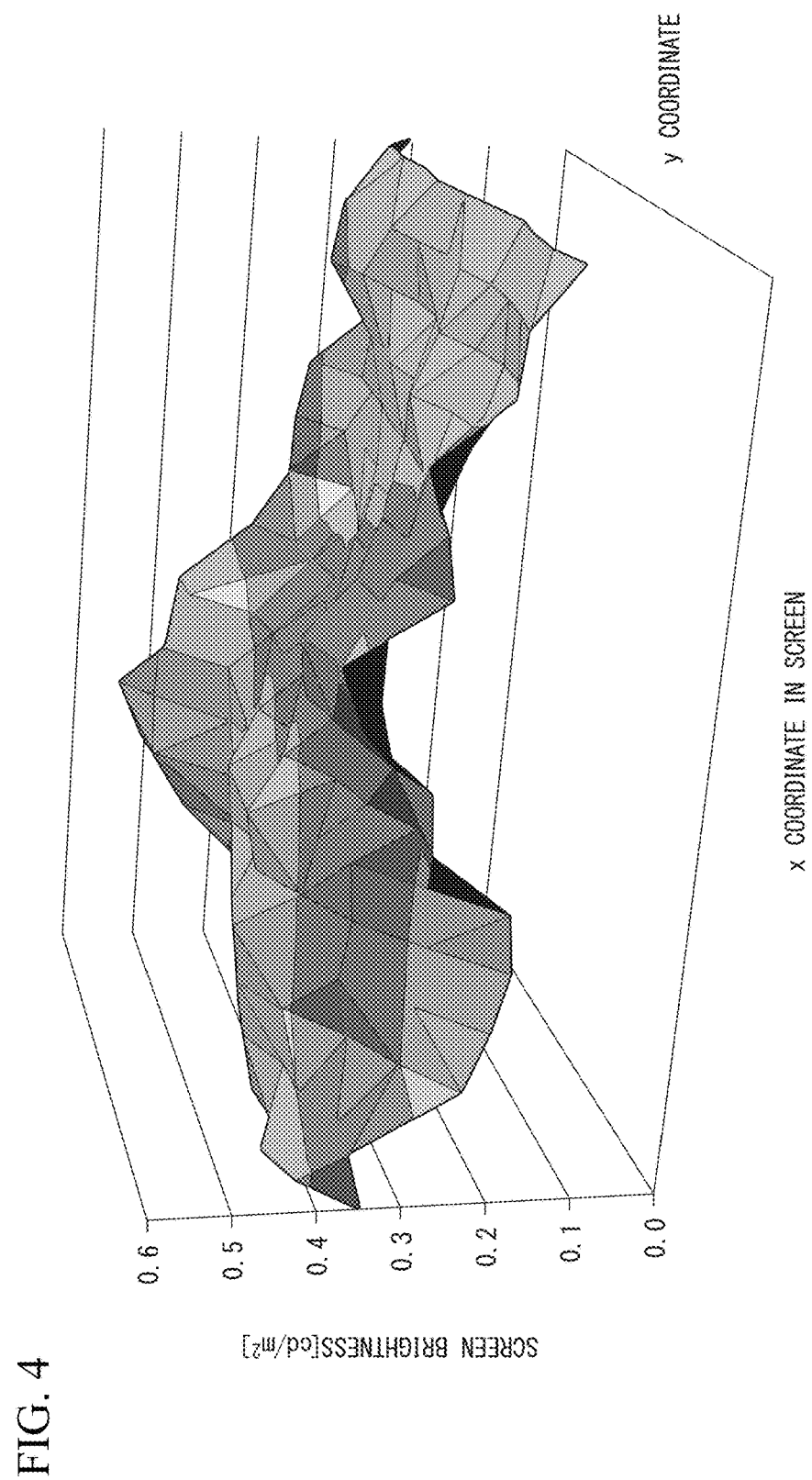
FIG. 4 is a diagram for explaining an example of a black unevenness characteristic of the image display unit according to the first exemplary embodiment.

The brightness unevenness characteristic calculation unit 203 reads the unevenness correction data for each gradation stored in the unevenness correction data storage unit 202, and uses the read unevenness correction data for each gradation to calculate a panel brightness unevenness characteristic 102 when uncorrected for each gradation. The brightness unevenness characteristic calculation unit 203 may calculate the unevenness characteristic when uncorrected by performing, for example, brightness conversion of the correction value with respect to the read unevenness correction data. The brightness unevenness characteristic calculation unit 203 outputs the calculated brightness unevenness characteristic at the 0 gradation when uncorrected as shown in FIG. 3 (also referred to as the 0-gradation panel brightness unevenness characteristic), to the first target unevenness characteristic calculation unit 205. The brightness unevenness characteristic calculation unit 203 outputs the calculated brightness unevenness characteristic at the 255 gradation when uncorrected as shown in FIG. 4 (also referred to as the 255-gradation panel brightness unevenness characteristic), to the second target unevenness characteristic calculation unit 206. Moreover, the brightness unevenness characteristic calculation unit 203 outputs the calculated brightness unevenness characteristic at each of from the 0 gradation to the 255 gradation when uncorrected, to the correction data generation unit 207.

FIG. 3 is a diagram for explaining an example of the white unevenness characteristic of the image display unit 6 according to the present exemplary embodiment. FIG. 4 is a diagram for explaining an example of the black unevenness characteristic of the image display unit 6 according to the present exemplary embodiment. In FIG. 3 and FIG. 4, the axis in the horizontal direction denotes a coordinate in the x axis direction in the image display unit 6, the axis in the depth direction denotes a coordinate in the y axis direction in the image display unit 6, and the vertical axis denotes screen brightness [cd/m$^2$] of the image display unit 6.

In the xy plane of the image display unit 6, at the time of displaying the white level, there is a variation in brightness (brightness unevenness) as shown in FIG. 3. Therefore, the characteristic is measured by the image pickup device (not shown) at the time of shipment, and the unevenness correction data for correcting brightness unevenness shown in FIG. 3 is stored in the unevenness correction data storage unit 202. The brightness unevenness characteristic at the 255 gradation calculated by the brightness unevenness characteristic calculation unit 203 is the characteristic when uncorrected. Therefore this becomes the characteristic as shown in FIG. 3.

Similarly, in the xy plane of the image display unit 6, at the time of displaying the black level, there is a variation in brightness as shown in FIG. 4. As a result, the brightness unevenness characteristic in the 0 gradation calculated by the brightness unevenness characteristic calculation unit 203 becomes the characteristic as shown in FIG. 4.

In the present exemplary embodiment, an example in which the unevenness correction data for each gradation set beforehand, is stored in the unevenness correction data storage unit 202 has been described. However, it is not limited thereto. Display unevenness data for each gradation when uncorrected may be stored in the unevenness correction data storage unit 202. In this case, the brightness unevenness characteristic calculation unit 203 may output the brightness unevenness characteristic when uncorrected when at the 0 gradation stored in the unevenness correction data storage unit 202, to the first target unevenness characteristic calculation unit 205, and may output the brightness unevenness characteristic when uncorrected when at the 255 gradation, to the second target unevenness characteristic calculation unit 206. Moreover, the brightness unevenness characteristic calculation unit 203 may output the brightness unevenness characteristics when uncorrected when at each of from the 0 gradation to the 255 gradation stored in the unevenness correction data storage unit 202, to the correction data generation unit 207.

Figure 5:
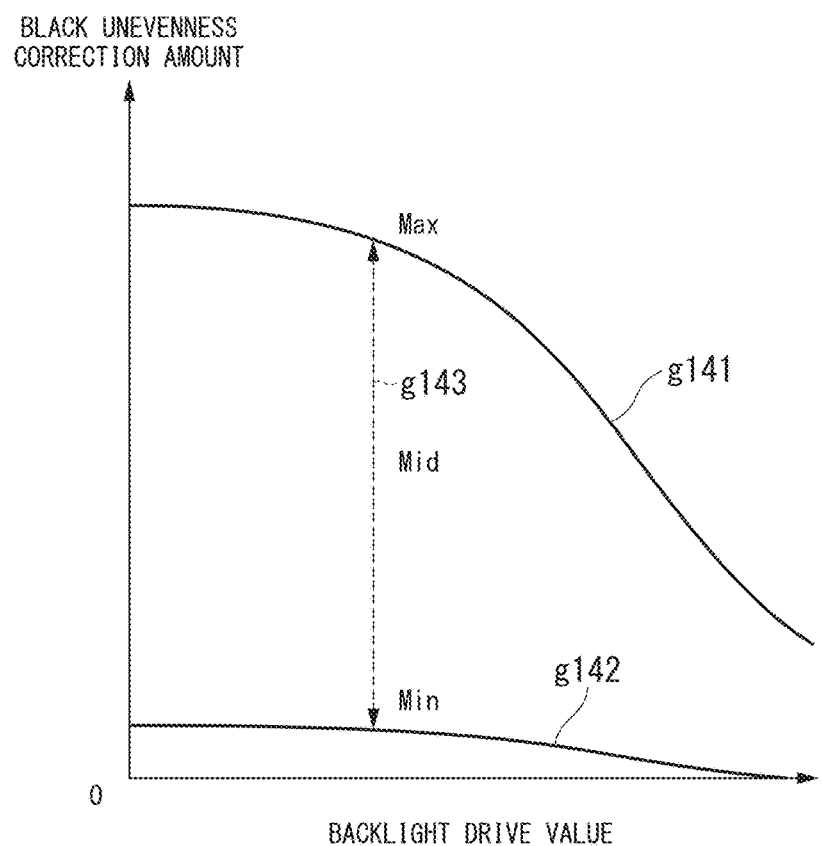
FIG. 5 is a diagram for explaining an example of a black unevenness correction amount according to the first exemplary embodiment.

The black unevenness correction amount calculation unit 204 calculates a target black unevenness correction amount 103 based on the set black level and the backlight drive value 101 input from the backlight control unit 201. The target black unevenness correction amount 103 is a parameter indicating how much the brightness unevenness characteristic when uncorrected when at the 0 gradation is corrected. The black level is, for example, 1[cd/m$^2$]. As shown in FIG. 5, for example, the black unevenness correction amount calculation unit 204 performs calculation so that it becomes a characteristic proportional to the black level and inversely proportional to the backlight drive amount. The black unevenness correction amount calculation unit 204 outputs the calculated target black unevenness correction amount 103, to the first target unevenness characteristic calculation unit 205.

FIG. 5 is a diagram for explaining an example of the black unevenness correction amount according to the present exemplary embodiment. In FIG. 5, the horizontal axis represents the backlight drive value, and the vertical axis represents the black unevenness correction amount. The curve g141 denotes the black unevenness correction amount with respect to the backlight drive value having the settable maximum value of the black level, and the curve g142 denotes the black unevenness correction amount with respect to the backlight drive value having the settable minimum value of the black level. By the user, the black level is selected between the curve g141 and the curve g142. For example, a numeral of brightness [cd/m$^2$] is selected or input as a set value of the black level by the user. As shown by the arrow g143, another curve is set between the curve g141 and the curve g142. A curve of the black unevenness correction amount based on the backlight drive value and the set black level, or an expression indicating the curve is stored beforehand in the black unevenness correction amount calculation unit 204 by actual measurement, simulation, or the like. The black unevenness correction amount calculation unit 204 calculates the black unevenness correction amount based on the backlight drive value and the set black level by using the stored curve or expression indicating the curve.

Returning to FIG. 1, description of the image correction device 2 is continued.

The first target unevenness characteristic calculation unit 205 calculates a target unevenness characteristic at the 0 gradation (hereinafter, referred to as 0-gradation target unevenness characteristic) based on the target black unevenness correction amount 103 input from the black unevenness correction amount calculation unit 204 and the 0-gradation panel brightness unevenness characteristic 102 input from the brightness unevenness characteristic calculation unit 203. For example, the first target unevenness characteristic calculation unit 205 replaces a brightness value of the 0-gradation panel brightness unevenness characteristic 102 lower than the target black unevenness correction amount 103, with the target black unevenness correction amount 103, to thereby calculate the 0-gradation target unevenness characteristic 105. The first target unevenness characteristic calculation unit 205 outputs the calculated 0-gradation target unevenness characteristic 105 to the correction data generation unit 207 and the determination unit 208.

Figure 6:
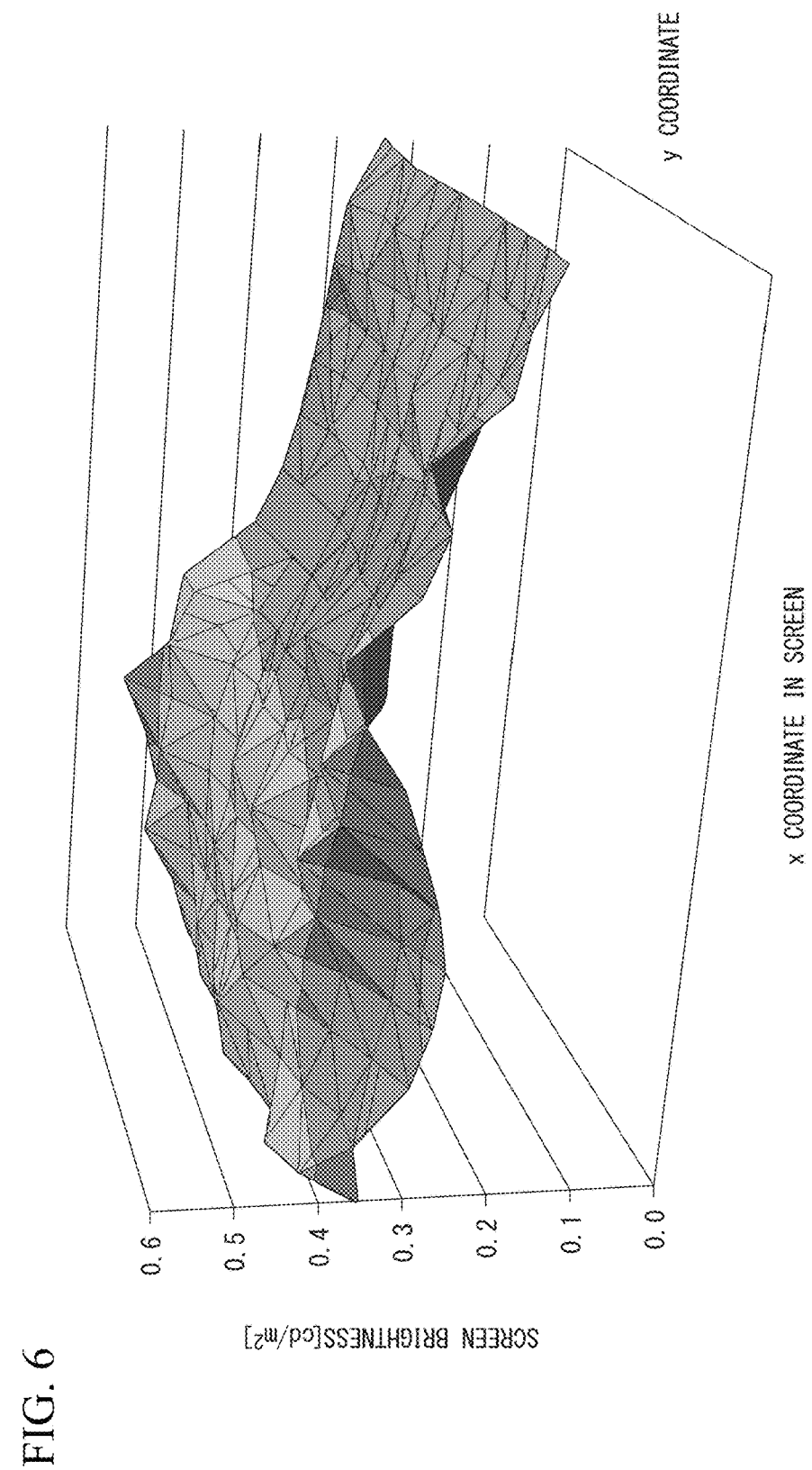
FIG. 6 is a diagram for explaining an example of the black unevenness characteristic at 0.1 cd/m$^2$ according to the first exemplary embodiment.
Figure 7:
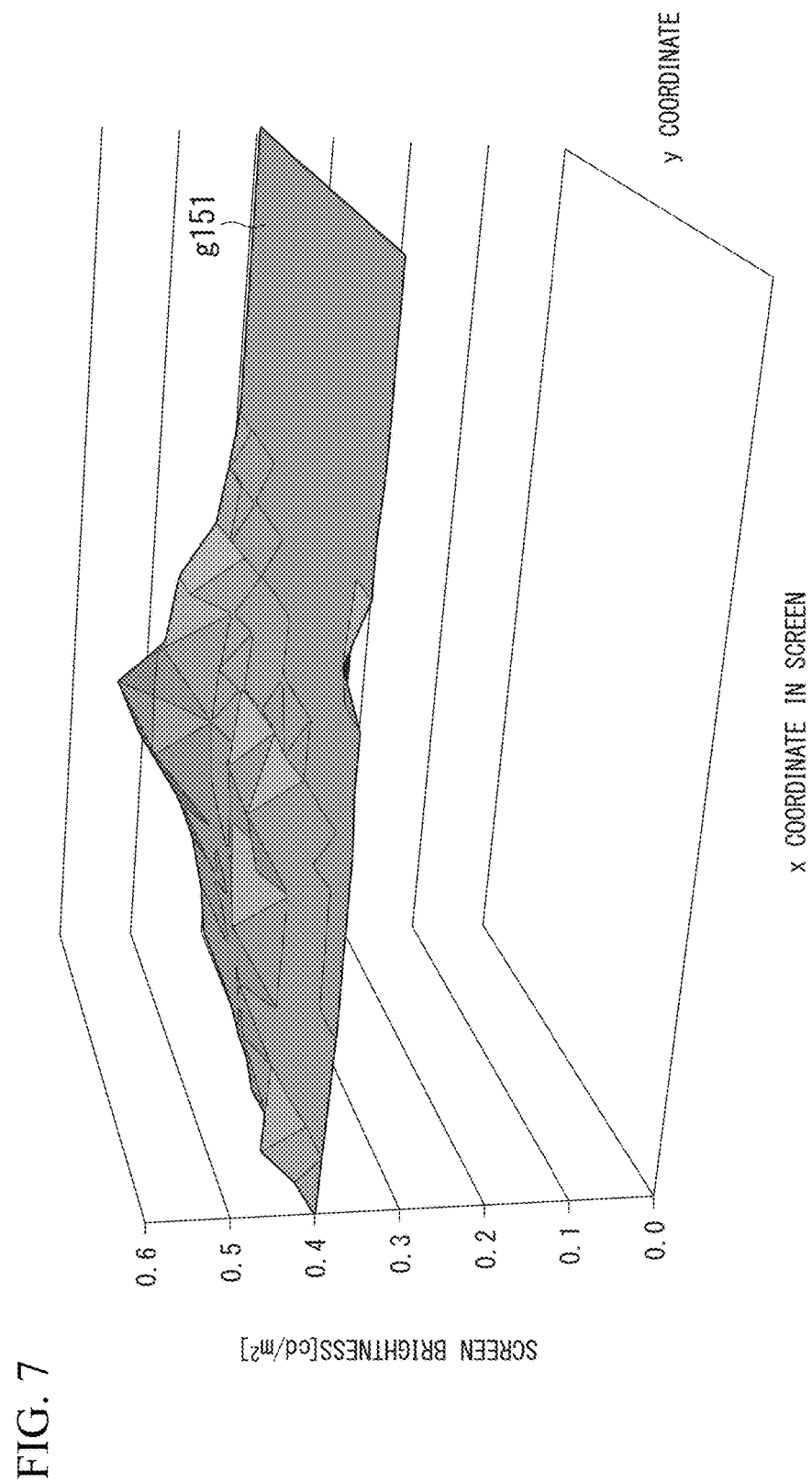
FIG. 7 is a diagram for explaining an example of the black unevenness characteristic at 0.4 cd/m$^2$ according to the first exemplary embodiment.
Figure 8:
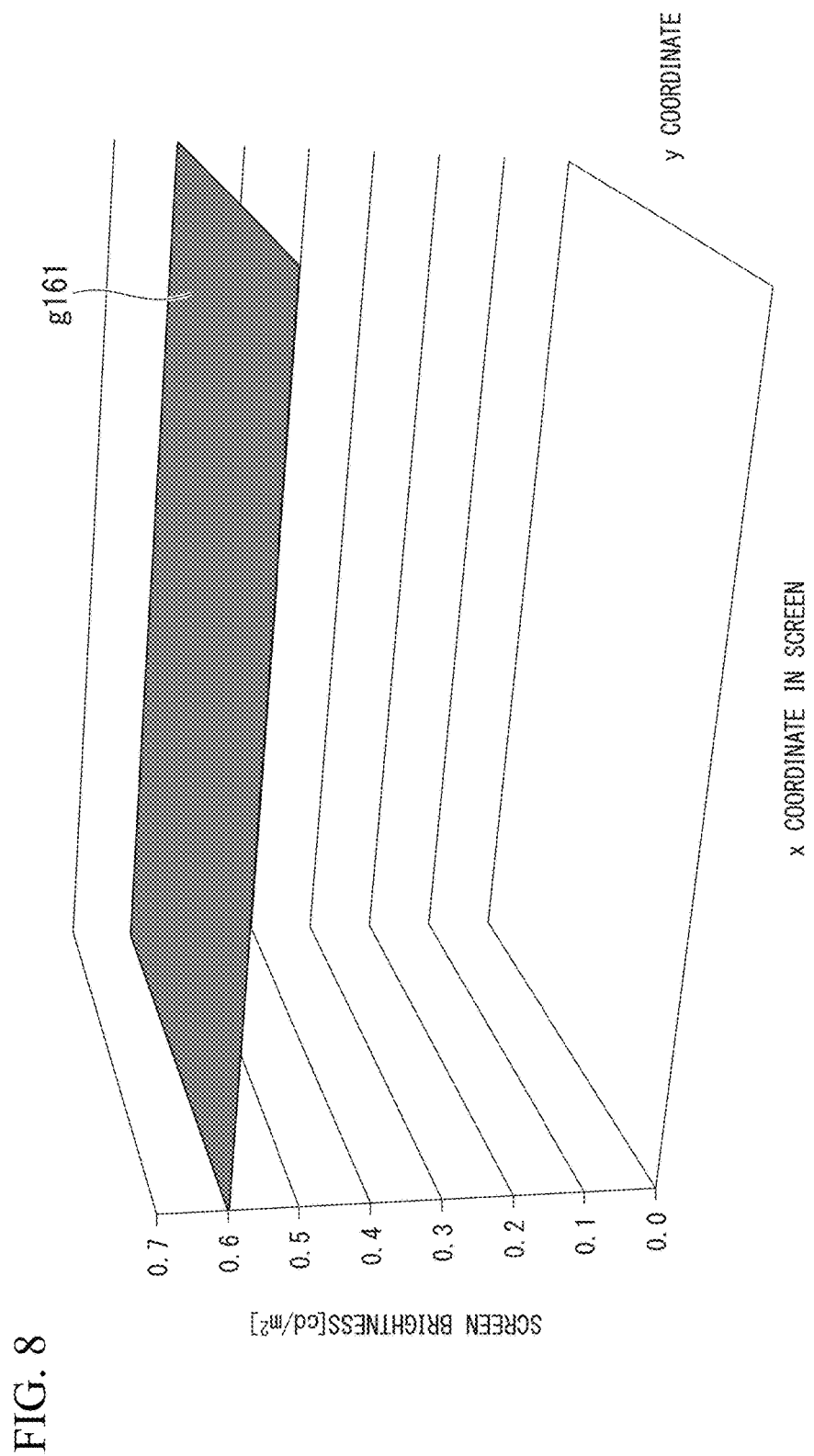
FIG. 8 is a diagram for explaining an example of the black unevenness characteristic at 0.6 cd/m$^2$ according to the first exemplary embodiment.

FIG. 6 is a diagram for explaining an example of the black unevenness characteristic at the time of 0.1 [cd/m$^2$] according to the present exemplary embodiment. FIG. 7 is a diagram for explaining an example of the black unevenness characteristic at the time of 0.4 [cd/m$^2$] according to the present exemplary embodiment. FIG. 8 is a diagram for explaining an example of the black unevenness characteristic at the time of 0.6 [cd/m$^2$] according to the present exemplary embodiment. Respective axes in FIG. 6 to FIG. 8 are the same as those in FIG. 2 and FIG. 3.

The characteristic shown in FIG. 6 is the black unevenness characteristic when the black level is set to 0.1 [cd/m$^2$] by the user. In the example shown in FIG. 6, brightness unevenness of the panel is higher than the black level set by the user. The first target unevenness characteristic calculation unit 205 compares a flat characteristic with the characteristic shown in FIG. 6. The first target unevenness characteristic calculation unit 205 adopts the black unevenness characteristic having a higher value than the flat characteristic as a target characteristic. For example, when the characteristic shown in FIG. 6 has a higher screen brightness than that of the flat characteristic, the entire higher screen brightness becomes the target characteristic.

Moreover, the characteristic shown in FIG. 7 is the black unevenness characteristic when the black level is set to 0.4 [cd/m$^2$] by the user. In the example shown in FIG. 7, about half of the target characteristic is overlapped on the black unevenness of the panel. In the case of being overlapped on each other, the first target unevenness characteristic calculation unit 205 selects the one having a higher value in the overlapped portion. That is to say, a brightness higher than the flat plane g151 is adopted as the target characteristic.

Furthermore, the characteristic shown in FIG. 8 is the black unevenness characteristic when the black level is set to 0.6 [cd/m$^2$] by the user. In the example shown in FIG. 8, the black level set by the user is higher than the brightness unevenness of the panel. Therefore the first target unevenness characteristic calculation unit 205 selects the higher one, that is to say, selects the plane g161 having the flat characteristic.

Returning to FIG. 1, description of the image correction device 2 is continued.

The second target unevenness characteristic calculation unit 206 calculates the target unevenness characteristic at the 255 gradation (hereinafter, referred to as the 255-gradation target unevenness characteristic) 106 based on the backlight drive value 101 input from the backlight control unit 201 and the 255-gradation panel brightness unevenness characteristic 102 input from the brightness unevenness characteristic calculation unit 203. For example, the second target unevenness characteristic calculation unit 206 calculates a 255-gradation target unevenness correction amount so as to become a characteristic inversely proportional to the input backlight drive value 101. The second target unevenness characteristic calculation unit 206 calculates the 255-gradation target unevenness correction amount having characteristic of a decreasing manner in which the unevenness correction amount is set to 100% when the backlight drive value is low and the unevenness correction amount is set to 0% (unevenness correction is in an off state) when the backlight drive value is maximum. In the present exemplary embodiment, it is assumed that the unevenness characteristic is the same as in FIG. 7. The second target unevenness characteristic calculation unit 206 outputs the calculated 255-gradation target unevenness characteristic 106 to the correction data generation unit 207 and the determination unit 208.

At the same backlight drive value, if unevenness correction is performed, brightness decreases. Therefore, if the target brightness can be realized, the unevenness correction amount is set to a maximum (100%) and if the brightness is insufficient, the unevenness correction amount is decreased, thereby to realize the target brightness. Therefore, in the present exemplary embodiment, it is set such that the unevenness correction amount is decreased as the white level set by the user becomes higher. The 255-gradation target unevenness correction amount when the unevenness correction amount is 100% is a value set at the time of manufacture, and the 255-gradation target unevenness correction amount when the unevenness correction amount is 0% is a value when unevenness correction is in the off state. The correction amount between 0% and 100% is calculated, for example, by interpolation based on the characteristics at 0% and 100%.

The correction data generation unit 207 includes a target unevenness characteristic generation unit 2071 and an unevenness correction data output unit 2072.

The target unevenness characteristic generation unit 2071 generates the target unevenness characteristics between the 0 gradation and the 255 gradation by using the 0-gradation target unevenness characteristic 105 input from the first target unevenness characteristic calculation unit 205 and the 255-gradation target unevenness characteristic 106 input from the second target unevenness characteristic calculation unit 206. For example, the target unevenness characteristic generation unit 2071 generates the target unevenness characteristics between the 0 gradation and the 255 gradation by interpolating the 0-gradation target unevenness characteristic 105 and the 255-gradation target unevenness characteristic 106. For the interpolation, a BiCubic interpolation method or a spline interpolation method is used. The target unevenness characteristic generation unit 2071 outputs the generated target unevenness characteristics between the 0 gradation and the 255 gradation, to the unevenness correction data output unit 2072.

The unevenness correction data output unit 2072 compares the target unevenness characteristics between the 0 gradation and the 255 gradation input from the target unevenness characteristic generation unit 2071 with the panel brightness unevenness characteristics 102 between the 0 gradation and the 255 gradation input from the brightness unevenness characteristic calculation unit 203 for each gradation, to generate the unevenness correction data for each gradation. The unevenness correction data output unit 2072 sets the generated unevenness correction data for each gradation in the unevenness correction 3D LUT 5.

The determination unit 208 compares the 0-gradation target unevenness characteristic 105 input from the first target unevenness characteristic calculation unit 205 with the 255-gradation target unevenness characteristic 106 input from the second target unevenness characteristic calculation unit 206 to generate information indicating a match or mismatch. The determination unit 208 outputs the generated information to the superposition unit 209. In the comparison of correction amounts, if it is within a predetermined allowable range, the determination unit 208A may determine that there is a match between these characteristics.

The superposition unit 209 superposes the information input from the determination unit 208 on an image signal input from the image input unit 4, and outputs the image signal superposed with the information to the unevenness correction 3D LUT 5. If information indicating a mismatch is input, there is a difference in the unevenness characteristics between gradations, and some positions (coordinates) in the screen do not meet the target black level. Therefore the superposition unit 209 generates information indicating a warning, and superposes the information indicating the generated warning on the image signal. That is to say, in the present exemplary embodiment, if the white level and the black level set by the user can be realized, a warning is not displayed, while if the white level and the black level cannot be realized, a warning is displayed.

The reason why a warning is displayed is that if the unevenness characteristics at all gradations are not same, color unevenness may occur as described with reference to FIG. 2, and an image quality defect may occur such that a display quality specification, for example, medical DICOM cannot be satisfied.

Figure 9:
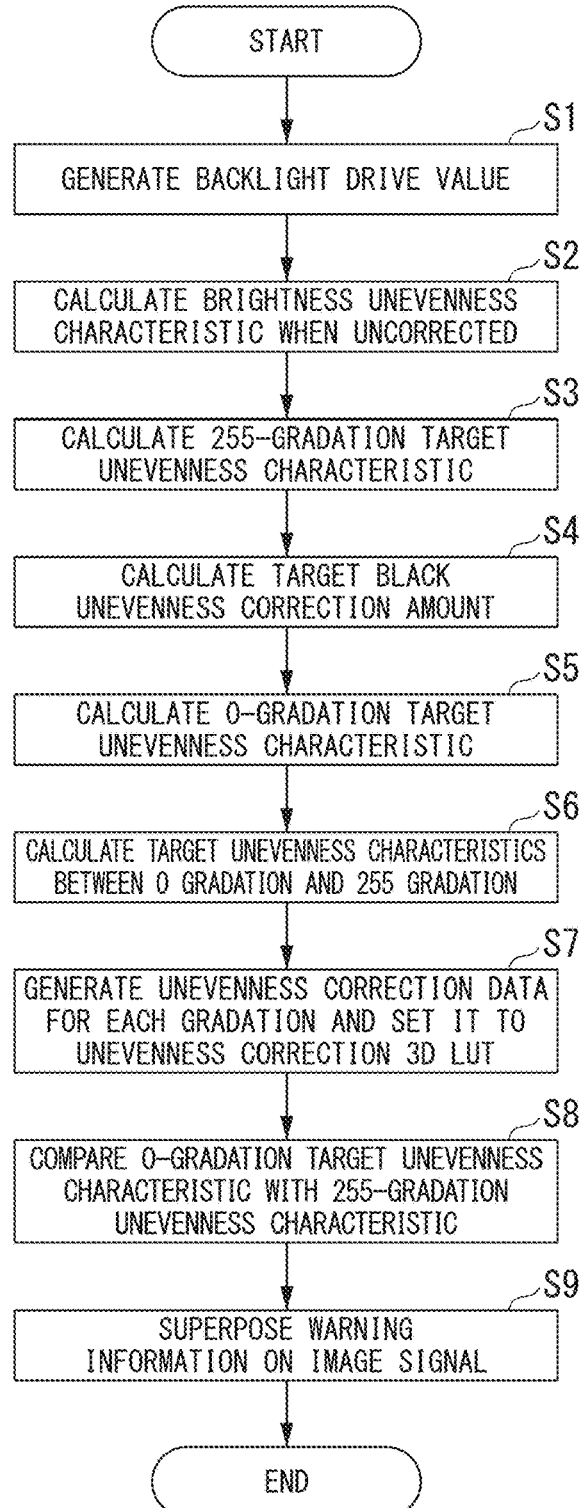
FIG. 9 is a flowchart of a process procedure of an image correction device according to the first exemplary embodiment.

FIG. 9 is a flowchart of a process procedure of the image correction device 2 according to the present exemplary embodiment.

In the process below, the unevenness correction data is set beforehand in the unevenness correction data storage unit 202 and the unevenness correction 3D LUT 5, and the white level and the black level are set by the user.

(Step S1) The backlight control unit 201 generates the backlight drive value 101 proportional to the value indicating the input white level. Next, the backlight control unit 201 outputs the generated backlight drive value 101 to the backlight 3, the black unevenness correction amount calculation unit 204, and the second target unevenness characteristic calculation unit 206.

(Step S2) The brightness unevenness characteristic calculation unit 203 reads the unevenness correction data for each gradation stored in the unevenness correction data storage unit 202. Next, the brightness unevenness characteristic calculation unit 203 uses the read unevenness correction data for each gradation to calculate the panel brightness unevenness characteristic 102 when uncorrected for each gradation, and outputs the calculated 0-gradation panel brightness unevenness characteristic to the first target unevenness characteristic calculation unit 205 and the 255-gradation panel brightness unevenness characteristic to the second target unevenness characteristic calculation unit 206. Moreover, the brightness unevenness characteristic calculation unit 203 outputs the calculated brightness unevenness characteristic when uncorrected when at each of from the 0 gradation to the 255 gradation, to the correction data generation unit 207.

(Step S3) The second target unevenness characteristic calculation unit 206 calculates the 255-gradation target unevenness characteristic 106 based on the backlight drive value 101 input from the backlight control unit 201 and the 255-gradation panel brightness unevenness characteristic 102 input from the brightness unevenness characteristic calculation unit 203. The second target unevenness characteristic calculation unit 206 outputs the calculated 255-gradation target unevenness characteristic 106 to the correction data generation unit 207 and the determination unit 208.

(Step S4) The black unevenness correction amount calculation unit 204 calculates the target black unevenness correction amount 103 based on the set black level and the backlight drive value 101 input from the backlight control unit 201. The black unevenness correction amount calculation unit 204 outputs the calculated target black unevenness correction amount 103 to the first target unevenness characteristic calculation unit 205.

(Step S5) The first target unevenness characteristic calculation unit 205 calculates the 0-gradation target unevenness characteristic 105 based on the target black unevenness correction amount 103 input from the black unevenness correction amount calculation unit 204 and the 0-gradation panel brightness unevenness characteristic 102 input from the brightness unevenness characteristic calculation unit 203. The first target unevenness characteristic calculation unit 205 outputs the calculated 0-gradation target unevenness characteristic 105 to the determination unit 208 and the correction data generation unit 207.

(Step S6) The target unevenness characteristic generation unit 2071 uses the 0-gradation target unevenness characteristic 105 input from the first target unevenness characteristic calculation unit 205 and the 255-gradation target unevenness characteristic 106 input from the second target unevenness characteristic calculation unit 206 to generate the target unevenness characteristics between the 0 gradation and the 255 gradation. The target unevenness characteristic generation unit 2071 outputs the generated target unevenness characteristics between the 0 gradation and the 255 gradation to the unevenness correction data output unit 2072.

(Step S7) The unevenness correction data output unit 2072 compares the target unevenness characteristics between the 0 gradation and the 255 gradation input from the target unevenness characteristic generation unit 2071 with the panel brightness unevenness characteristics 102 between the 0 gradation and the 255 gradation input from the brightness unevenness characteristic calculation unit 203 for each gradation to generate unevenness correction data for each gradation. The unevenness correction data output unit 2072 sets the generated unevenness correction data for each gradation in the unevenness correction 3D LUT 5.

(Step S8) The determination unit 208 compares the 0-gradation target unevenness characteristic 105 input from the first target unevenness characteristic calculation unit 205 with the 255-gradation target unevenness characteristic 106 input from the second target unevenness characteristic calculation unit 206 to generate the information indicating a match or mismatch. The determination unit 208 outputs the generated information to the superposition unit 209.

(Step S9) If the input information indicates a mismatch, the superposition unit 209 generates the warning information. Next, the superposition unit 209 superposes the generated warning information on the image signal input from the image input unit 4, and outputs the image signal superposed with the information to the unevenness correction 3D LUT 5.

Next, an example of a process performed by the determination unit 208 in step S8 is described.

Figure 10:
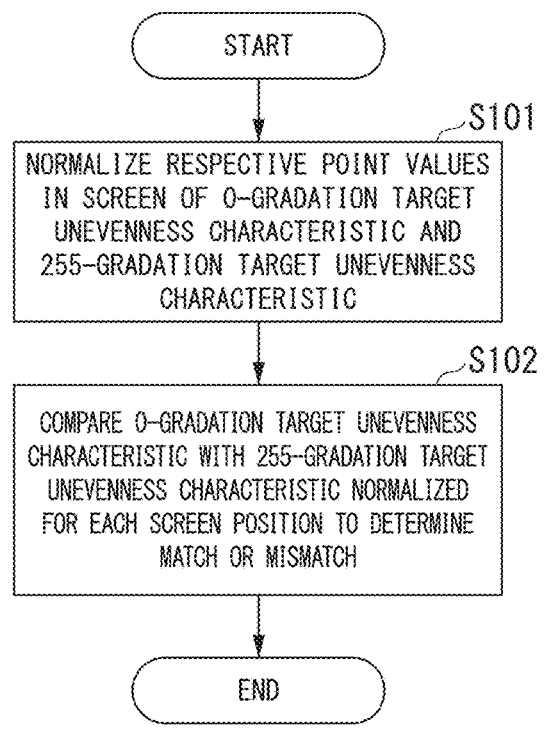
FIG. 10 is a flowchart of a process procedure performed by a determination unit according to the first exemplary embodiment.

FIG. 10 is a flowchart of a process procedure performed by the determination unit 208 according to the present exemplary embodiment.

(Step S101) The determination unit 208 uses the values at the center of the screen (brightness or gradation value) for each of the 0-gradation target unevenness characteristic 105 and the 255-gradation target unevenness characteristic 106 as a reference (100%) to normalize the respective point values in the screen.

(Step S102) The determination unit 208 compares the normalized 0-gradation target unevenness characteristic 105 with the normalized 255-gradation target unevenness characteristic 106 for each screen position. Upon detection of a mismatch point, the determination unit 208 outputs the information indicating a mismatch to the superposition unit 209.

In the above-described example, an example in which step S4 and step S5 are performed after performing step S3 has been described. However, step S3 may be performed after performing step S4 and step S5. Alternatively, step S3, step S4, and step S5 may be performed in parallel.

The image correction device of the present exemplary embodiment includes: a first target unevenness characteristic calculation unit that calculates a first target unevenness characteristic based on a first uncorrected unevenness characteristic and a correction amount, the first uncorrected unevenness characteristic being an uncorrected unevenness characteristic at a first gradation, the uncorrected unevenness characteristic being a characteristic of brightness unevenness of a display panel when uncorrected, the correction amount being calculated based on a backlight drive value and a black level; a second target unevenness characteristic calculation unit that calculates a second target unevenness characteristic based on a second uncorrected unevenness characteristic and the backlight drive value, the second uncorrected unevenness characteristic being the uncorrected unevenness characteristic at a second gradation different from the first gradation; and a correction data generation unit that generates correction data for each gradation for correcting an image signal, based on the first uncorrected unevenness characteristic, the second uncorrected unevenness characteristic, the first target unevenness characteristic, and the second target unevenness characteristic.

According to the configuration, the image correction device according to the present exemplary embodiment does not perform black level adjustment by fixing the unevenness characteristic to adjust an offset of the image signal as in the conventional manner, but performs black level adjustment by changing the unevenness characteristic on a black screen. Moreover, according to the present exemplary embodiment, the target black unevenness correction amount 103 is a value calculated by using not only the set black level but also the white level, and hence, the black unevenness characteristic is adjusted according to the target white level and black level. Furthermore, the image correction device according to the present exemplary embodiment decides the unevenness characteristic on the white screen independently of the black unevenness characteristic, and has two target unevenness characteristics in black and white independently. Then the image correction device according to the present exemplary embodiment can set the unevenness characteristic in the intermediate gradation for each display gradation so as to continuously shift between two characteristics. On the other hand, according to the conventional technique, adjustment is made so as to have the common unevenness characteristic between gradations as described above.

Thus, according to the present exemplary embodiment, the unevenness correction value can be automatically adjusted with respect to the set value of the white level and the black level set by the user. As a result, according to the present exemplary embodiment, display unevenness can be corrected, depending on the preference of the user.

Moreover, in the present exemplary embodiment, the unevenness correction amount is automatically set so that the screen unevenness becomes a minimum while satisfying the set white/black level based on the need for "color reproduction accuracy" of graphic or medical users. The priority in the need for "color reproduction accuracy" is such that the white level has the highest priority, and the black level is the second, and then in order of the white unevenness characteristic and the black unevenness characteristic. That is to say, in the present exemplary embodiment, the image is adjusted in the order of the need for "color reproduction accuracy" of graphic or medical users.

Furthermore, in the present exemplary embodiment, a warning can be issued to the user if there is a screen portion that does not meet the target display characteristic or if color unevenness could occur.

As described above, according to the present exemplary embodiment, the "color reproduction accuracy" with respect to the wide target white/black level setting of the user can be improved and the number of adjustment items such as white unevenness setting and black unevenness setting can be decreased, thereby enabling to obtain an effect of providing "simple user friendliness".

Second Exemplary Embodiment

Figure 11:
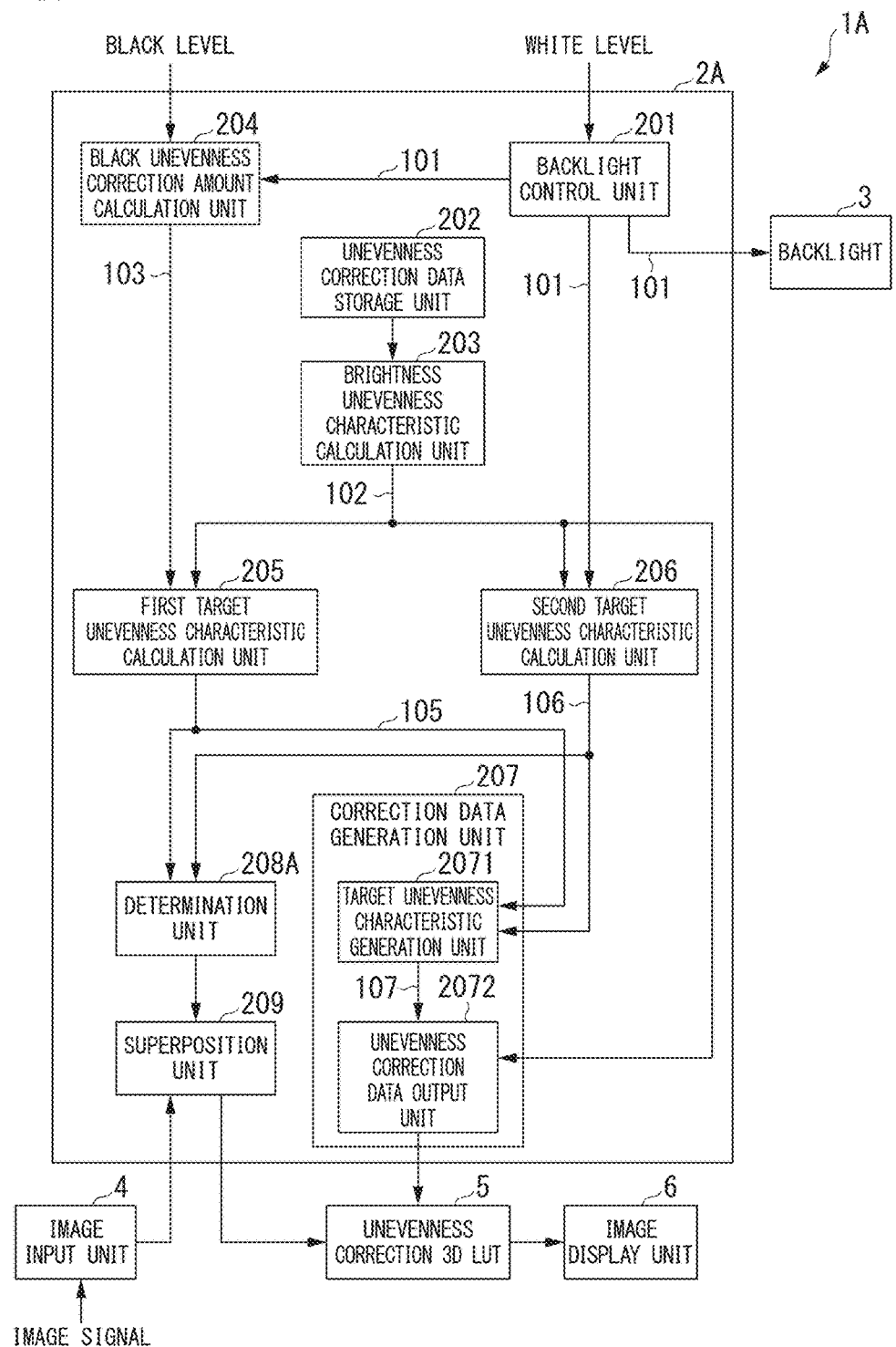
FIG. 11 is a schematic configuration diagram of a display system according to a second exemplary embodiment.

FIG. 11 is a schematic configuration diagram of a display system 1A according to the present exemplary embodiment. Functional units having the same functions as those of the display system 1 described in the first exemplary embodiment are denoted by the same reference symbols, and description thereof is omitted.

As shown in FIG. 11, the display system 1A is configured to include an image correction device 2A, a backlight 3, an image input unit 4, an unevenness correction 3D LUT 5, and an image display unit 6.

The image correction device 2A includes a backlight control unit 201, an unevenness correction data storage unit 202, a brightness unevenness characteristic calculation unit 203, a black unevenness correction amount calculation unit 204, a first target unevenness characteristic calculation unit 205, a second target unevenness characteristic calculation unit 206, a correction data generation unit 207, a determination unit 208A, and a superposition unit 209. Moreover, the correction data generation unit 207 includes a target unevenness characteristic generation unit 2071 and an unevenness correction data output unit 2072.

If the 0-gradation target unevenness characteristic 105 input from the first target unevenness characteristic calculation unit 205 and the 255-gradation target unevenness characteristic 106 input from the second target unevenness characteristic calculation unit 206 have the same value in the screen (for example, the flat characteristic shown in FIG. 8), the determination unit 208A determines that there is a match, while if they do not have the same value in the screen, the determination unit 208A determines that there is a mismatch. The determination unit 208A outputs the determination result to the superposition unit 209. In the comparison of correction amounts, if it is within a predetermined allowable range, the determination unit 208A may determine that there is a match.

According to the present exemplary embodiment, as in the first exemplary embodiment, display unevenness can be corrected depending on the preference of the user. Moreover, according to the present exemplary embodiment, when there is a difference between unevenness characteristics between gradations, this matter can be notified to the user.

Third Exemplary Embodiment

Figure 12:
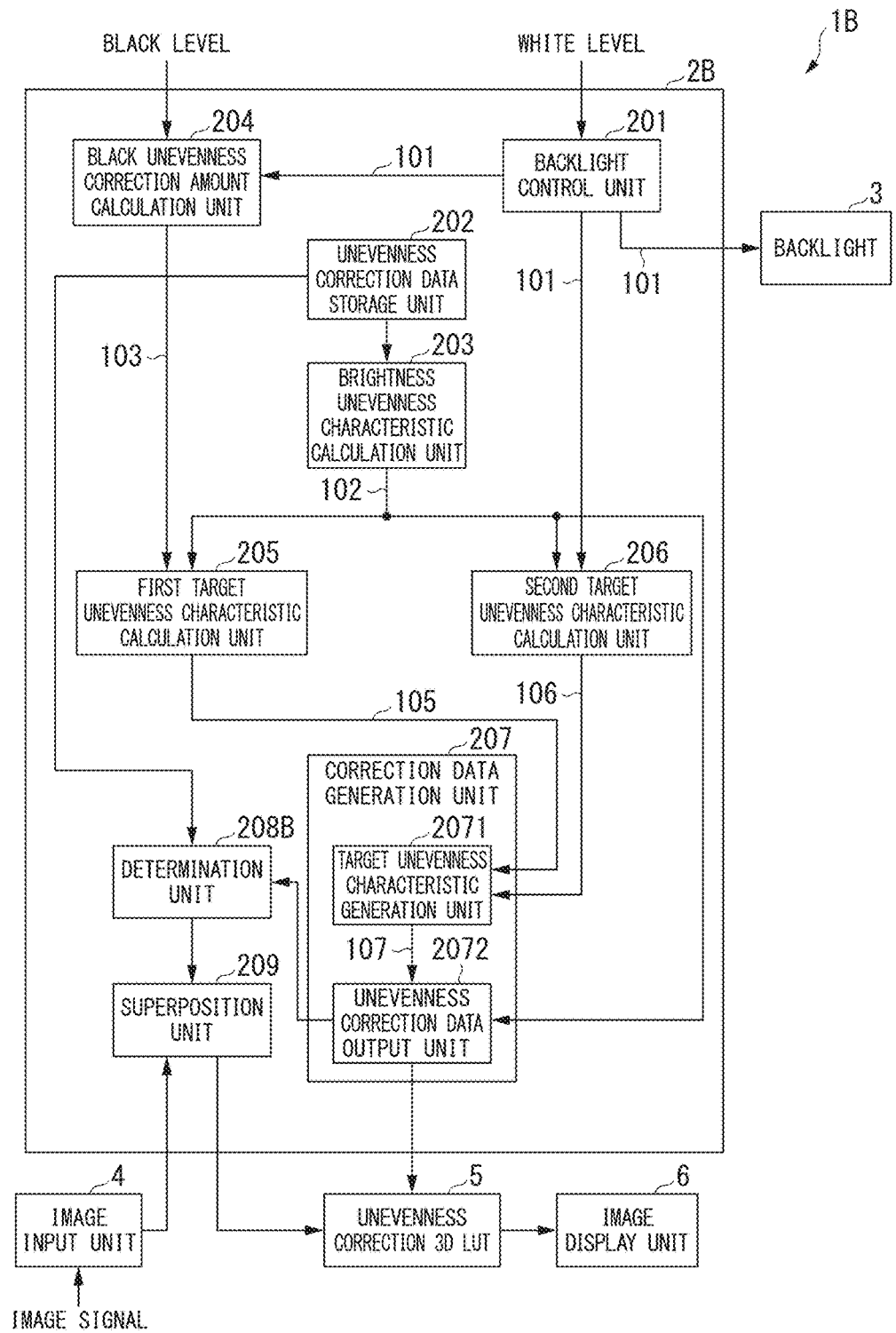
FIG. 12 is a schematic configuration diagram of a display system according to a third exemplary embodiment.

FIG. 12 is a schematic configuration diagram of a display system 1B according to the present exemplary embodiment. Functional units having the same functions as those of the display system 1 described in the first exemplary embodiment are denoted by the same reference symbols, and description thereof is omitted.

As shown in FIG. 12, the display system 1B is configured to include an image correction device 2B, a backlight 3, an image input unit 4, an unevenness correction 3D LUT 5, and an image display unit 6.

The image correction device 2A includes a backlight control unit 201, an unevenness correction data storage unit 202, a brightness unevenness characteristic calculation unit 203, a black unevenness correction amount calculation unit 204, a first target unevenness characteristic calculation unit 205, a second target unevenness characteristic calculation unit 206, a correction data generation unit 207, a determination unit 208B, and a superposition unit 209. Moreover, the correction data generation unit 207 includes a target unevenness characteristic generation unit 2071 and an unevenness correction data output unit 2072.

The determination unit 208B reads pieces of unevenness correction data for each gradation stored in the unevenness correction data storage unit 202, and obtains pieces of unevenness correction data between the 0 gradation and the 255 gradation generated by the unevenness correction data output unit 2072. The determination unit 208B determines whether two pieces of unevenness correction data match with each other or do not match for each gradation. It is assumed that the pieces of unevenness correction data for each gradation stored in the unevenness correction data storage unit 202 are adjusted to have the same characteristic at each gradation. The determination unit 208B outputs the determination result to the superposition unit 209. In the comparison of correction amounts, if it is within a predetermined allowable range, the determination unit 208B may determine that there is a match.

According to the present exemplary embodiment, as in the first exemplary embodiment, display unevenness can be corrected depending on the preference of the user. Moreover, according to the present exemplary embodiment, when there is a difference between unevenness characteristics between gradations, this matter can be notified to the user.

In the first exemplary embodiment to the third exemplary embodiment, an example in which the pieces of unevenness correction data for each gradation set beforehand, are stored in the unevenness correction data storage unit 202 at the time of shipment or the like has been described. However, they are not limited thereto. A user, an administrator, or a worker who performs maintenance of the display system (1, 1A, and 1B) may store the pieces of unevenness correction data for each gradation, in the unevenness correction data storage unit 202 based on a measurement result obtained by using an image pickup device (not shown) after use.

Moreover, in the first exemplary embodiment to the third exemplary embodiment, an example in which the image correction device (2, 2A, and 2B) includes the superposition unit 209 has been described. However, the superposition unit 209 need not be included in the image correction device (2, 2A, and 2B). In this case, the determination unit (208, 208A, and 208B) of the image correction device (2, 2A, and 2B) may output the determination result to the superposition unit 209.

Furthermore, in the first exemplary embodiment to the third exemplary embodiment, the display system (1, 1A, and 1B) has been described as an example. However, they are not limited thereto. The display system (1, 1A, and 1B) may be a mobile terminal or the like such as a tablet or a smart phone that displays the image signal and includes a backlight.

A program for realizing the respective functions of the image correction devices (2, 2A, and 2B) in FIG. 1 in the above-described exemplary embodiments may be recorded on a computer readable recording medium, and the program recorded on the recording medium may be read and executed by a computer system, thereby performing the processes of the respective units. The "computer system" referred to herein includes hardware such as an OS and a peripheral device.

Moreover, the "computer system" includes a website provision environment (or display environment) if a WWW system is used.

Furthermore, the "computer readable recording medium" stands for portable media such as a flexible disk, a magnetooptic disk, a ROM (Read Only Memory), and a CD-ROM, or a storage device such as a USB memory connected via a USB (Universal Serial Bus) I/F (interface) and a hard disk incorporated in the computer system. Furthermore, the "computer readable recording medium" also includes one that holds a program for a certain period of time, such as a volatile memory in the computer system, which becomes a server or a client. Moreover, the above program may be one that realizes a part of the functions described above, and may be one that can realize the functions described above in combination with a program already recorded in the computer system.

As described above, the exemplary embodiments of the present invention have been described in detail with reference to the drawings. However, the specific configurations are not limited thereto, and various design changes can be included without departing from the scope of the present invention.

Aspects of the present invention can be collectively expressed as the following supplementary notes 1 to 12.

(Supplementary Note 1)

An image correction device including:

a first target unevenness characteristic calculation unit that calculates a first target unevenness characteristic based on a first uncorrected unevenness characteristic and a correction amount, the first uncorrected unevenness characteristic being an uncorrected unevenness characteristic at a first gradation, the uncorrected unevenness characteristic being a characteristic of brightness unevenness of a display panel when uncorrected, the correction amount being calculated based on a backlight drive value and a black level;

a second target unevenness characteristic calculation unit that calculates a second target unevenness characteristic based on a second uncorrected unevenness characteristic and the backlight drive value, the second uncorrected unevenness characteristic being the uncorrected unevenness characteristic at a second gradation different from the first gradation; and a correction data generation unit that generates correction data for each gradation for correcting an image signal, based on the first uncorrected unevenness characteristic, the second uncorrected unevenness characteristic, the first target unevenness characteristic, and the second target unevenness characteristic.

(Supplementary Note 2)

The image correction device according to supplementary note 1, including:

a brightness unevenness calculation unit that calculates the uncorrected unevenness characteristic for each of a plurality of gradations including the first gradation and the second gradation, based on a preset unevenness characteristic with respect to each of the plurality of gradations for correcting display unevenness.

(Supplementary Note 3)

The image correction device according to supplementary note 1 or 2, including:

a correction amount calculation unit that calculates the correction amount based on a characteristic that is proportional to the black level and inversely proportional to the backlight drive value.

(Supplementary Note 4)

The image correction device according to any one of supplementary notes 1 to 3, wherein the correction data generation unit generates a target unevenness characteristic between the first gradation and the second gradation by using the first target unevenness characteristic and the second target unevenness characteristic, and the correction data generation unit compares the uncorrected unevenness characteristic at each gradation with the generated target unevenness characteristic between the first gradation and the second gradation for each gradation, and generates correction data for each gradation for correcting an image signal.

(Supplementary Note 5) The image correction device according to any one of supplementary notes 1 to 4, wherein the correction data for each gradation generated by the correction data generation unit is 3D LUT data.

(Supplementary Note 6)

The image correction device according to any one of supplementary notes 1 to 5, wherein the backlight drive value is a drive value of a backlight corresponding to a white level.

(Supplementary Note 7)

The image correction device according to any one of supplementary notes 1 to 6, including:

a determination unit that compares the first target unevenness characteristic with the second target unevenness characteristic, the determination unit determining that there is a match when the first target unevenness characteristic and the second target unevenness characteristic are within a predetermined range, the determination unit determining that there is a mismatch when the first target unevenness characteristic and the second target unevenness characteristic are outside of the predetermined range; and a superposition unit that generates warning information when a determination result of the determination unit indicates the mismatch, and superposes the generated warning information on the image signal.

(Supplementary Note 8)

The image correction device according to supplementary note 7, wherein the determination unit normalizes values at each point in a display unit where an image is displayed respectively in the first target unevenness characteristic and the second target unevenness characteristic, with a value at a predetermined position in the display unit serving as a reference, the determination unit determining that there is a match when the normalized first target unevenness characteristic and the normalized second target unevenness characteristic for each point in the display unit are within a predetermined range, the determination unit determining that there is a mismatch when the normalized first target unevenness characteristic and the normalized second target unevenness characteristic are outside of the predetermined range.

(Supplementary Note 9)

The image correction device according to any one of supplementary notes 1 to 6, including:

a determination unit that determines that there is a match when a value included in the first target unevenness characteristic and a value included in the second target unevenness characteristic are within a predetermined range at a predetermined position in a display unit where an image is displayed, the determination unit determining that there is a mismatch when they are outside of the predetermined range; and a superposition unit that generates warning information when a determination result of the determination unit indicates a mismatch, and superposes the generated warning information on the image signal.

(Supplementary Note 10)

The image correction device according to any one of supplementary notes 2 to 6, including:

a determination unit that determines that there is a match when a value included in the preset unevenness characteristic with respect to each of the plurality of gradations for correcting display unevenness, and a value included in the correction data for each of the gradations generated by the correction data generation unit are within a predetermined range, the determination unit determining that there is a mismatch when they are outside of the predetermined range; and a superposition unit that generates warning information when a determination result of the determination unit indicates a mismatch, and superposes the generated warning information on the image signal.

(Supplementary Note 11)

A display device including:

a display panel that displays an image;

a first target unevenness characteristic calculation unit that calculates a first target unevenness characteristic based on a first uncorrected unevenness characteristic and a correction amount, the first uncorrected unevenness characteristic being an uncorrected unevenness characteristic at a first gradation, the uncorrected unevenness characteristic being a characteristic of brightness unevenness of the display panel when uncorrected, the correction amount being calculated based on a backlight drive value and a black level;

a second target unevenness characteristic calculation unit that calculates a second target unevenness characteristic based on a second uncorrected unevenness characteristic and the backlight drive value, the second uncorrected unevenness characteristic being the uncorrected unevenness characteristic at a second gradation different from the first gradation; and a correction data generation unit that generates correction data for each gradation for correcting an image signal, based on the first uncorrected unevenness characteristic, the second uncorrected unevenness characteristic, the first target unevenness characteristic, and the second target unevenness characteristic.

(Supplementary Note 12)

An image correction method including:

a first target unevenness characteristic calculation step of calculating a first target unevenness characteristic based on a first uncorrected unevenness characteristic and a correction amount, the first uncorrected unevenness characteristic being an uncorrected unevenness characteristic at a first gradation, the uncorrected unevenness characteristic being a characteristic of brightness unevenness of a display panel when uncorrected, the correction amount being calculated based on a backlight drive value and a black level;

a second target unevenness characteristic calculation step of calculating a second target unevenness characteristic based on a second uncorrected unevenness characteristic and the backlight drive value, the second uncorrected unevenness characteristic being the uncorrected unevenness characteristic at a second gradation different from the first gradation; and a correction data generation step of generating correction data for each gradation for correcting an image signal, based on the first uncorrected unevenness characteristic, the second uncorrected unevenness characteristic, the first target unevenness characteristic, and the second target unevenness characteristic.

REFERENCE SYMBOLS 1, 1A, 1B Display system
2, 2A, 2B Image correction device
3 Backlight
4 Image input unit
5 Unevenness correction 3D LUT
6 Image display unit 6
201 Backlight control unit
202 Unevenness correction data storage unit
203 Brightness unevenness characteristic calculation unit
204 Black unevenness correction amount calculation unit
205 First target unevenness characteristic calculation unit
206 Second target unevenness characteristic calculation unit
207 Correction data generation unit
208 Determination unit
209 Superposition unit

The invention claimed is:

1. An image correction device, comprising:

a first target unevenness characteristic calculation unit that calculates a first target unevenness characteristic by replacing a brightness value of a first uncorrected unevenness characteristic lower than a correction amount with the correction amount, the first uncorrected unevenness characteristic being an uncorrected unevenness characteristic at a first gradation, the uncorrected unevenness characteristic being a characteristic of brightness unevenness of a display panel when uncorrected, the correction amount being calculated based on a characteristic that is proportional to a black level and inversely proportional to a backlight drive value;

a second target unevenness characteristic calculation unit that calculates a second target unevenness characteristic based on a second uncorrected unevenness characteristic and the backlight drive value, the second uncorrected unevenness characteristic being the uncorrected unevenness characteristic at a second gradation different from the first gradation; and a correction data generation unit that generates correction data for each gradation for correcting an image signal, based on the first uncorrected unevenness characteristic, the second uncorrected unevenness characteristic, the first target unevenness characteristic, and the second target unevenness characteristic.

2. The image correction device according to claim 1, further comprising:

a brightness unevenness calculation unit that calculates the uncorrected unevenness characteristic for each of a plurality of gradations including the first gradation and the second gradation, based on a preset unevenness characteristic with respect to each of the plurality of gradations for correcting display unevenness.

3. The image correction device according to claim 1, further comprising:

a correction amount calculation unit that calculates the correction amount based on the characteristic that is proportional to the black level and inversely proportional to the backlight drive value.

4. The image correction device according to claim 1, wherein the correction data generation unit generates a target unevenness characteristic between the first gradation and the second gradation by using the first target unevenness characteristic and the second target unevenness characteristic, and wherein the correction data generation unit compares the uncorrected unevenness characteristic at each gradation with the generated target unevenness characteristic between the first gradation and the second gradation for each gradation, and generates correction data for each gradation for correcting an image signal.

5. The image correction device according to claim 1, wherein the correction data for each gradation generated by the correction data generation unit comprises three-dimensional lookup table (3D LUT) data.

6. The image correction device according to claim 1, wherein the backlight drive value comprises a drive value of a backlight corresponding to a white level.

7. The image correction device according to claim 1, further comprising:
   a determination unit that compares the first target unevenness characteristic with the second target unevenness characteristic, the determination unit determining that the first target unevenness characteristic matches with the second target unevenness characteristic when a difference between the first target unevenness characteristic and the second target unevenness characteristic is within a predetermined range, the determination unit determining that the first target unevenness characteristic does not match with the second target unevenness characteristic when the difference between the first target unevenness characteristic and the second target unevenness characteristic is outside of the predetermined range; and
   a superposition unit that generates warning information when the first target unevenness characteristic does not match with the second target unevenness characteristic, and superposes the generated warning information on the image signal.

8. The image correction device according to claim 7, wherein the determination unit normalizes values of each of the first target unevenness characteristic and the second target unevenness characteristic at each point in a display unit where an image is displayed, with a value at a predetermined position in the display unit serving as a reference, the determination unit determining that the first target unevenness characteristic matches with the second target unevenness characteristic when a difference between the normalized first target unevenness characteristic and the normalized second target unevenness characteristic for each point in the display unit is within a predetermined range, the determination unit determining that the first target unevenness characteristic does not match with the second target unevenness characteristic when the difference between the normalized first target unevenness characteristic and the normalized second target unevenness characteristic is outside of the predetermined range.

9. The image correction device according to claim 1, further comprising:
   a determination unit that determines that the first target unevenness characteristic matches with the second target unevenness characteristic when a difference between a value included in the first target unevenness characteristic and a value included in the second target unevenness characteristic at a predetermined position in a display unit where an image is displayed is within a predetermined range, the determination unit determining that the first target unevenness characteristic does not match with the second target unevenness characteristic when the difference is outside of the predetermined range; and
   a superposition unit that generates warning information when the first target unevenness characteristic does not match with the second target unevenness characteristic, and superposes the generated warning information on the image signal.

10. The image correction device according to claim 2, further comprising:
    a determination unit that determines that the first target unevenness characteristic matches with the second target unevenness characteristic when a difference between a value included in the preset unevenness characteristic with respect to each of the plurality of gradations for correcting display unevenness, and a value included in the correction data for each of the gradations generated by the correction data generation unit is within a predetermined range, the determination unit determining that the first target unevenness characteristic does not match with the second target unevenness characteristic when the difference is outside of the predetermined range; and
    a superposition unit that generates warning information when a determination result of the determination unit indicates a mismatch, and superposes the generated warning information on the image signal.

11. A display device, comprising:
    a display panel that displays an image;
    a first target unevenness characteristic calculation unit that calculates a first target unevenness characteristic by replacing a brightness value of a first uncorrected unevenness characteristic lower than a correction amount with the correction amount, the first uncorrected unevenness characteristic being an uncorrected unevenness characteristic at a first gradation, the uncorrected unevenness characteristic being a characteristic of brightness unevenness of the display panel when uncorrected, the correction amount being calculated based on a characteristic that is proportional to a black level and inversely proportional to a backlight drive value;
    a second target unevenness characteristic calculation unit that calculates a second target unevenness characteristic based on a second uncorrected unevenness characteristic and the backlight drive value, the second uncorrected unevenness characteristic being the uncorrected unevenness characteristic at a second gradation different from the first gradation; and
    a correction data generation unit that generates correction data for each gradation for correcting an image signal, based on the first uncorrected unevenness characteristic, the second uncorrected unevenness characteristic, the first target unevenness characteristic, and the second target unevenness characteristic.

12. An image correction method comprising:
    calculating a first target unevenness characteristic by replacing a brightness value of a first uncorrected unevenness characteristic lower than a correction amount with the correction amount, the first uncorrected unevenness characteristic being an uncorrected unevenness characteristic at a first gradation, the uncorrected unevenness characteristic being a characteristic of brightness unevenness of a display panel when uncorrected, the correction amount being calculated based on a characteristic that is proportional to black level and inversely proportional to a backlight drive value;
    calculating a second target unevenness characteristic based on a second uncorrected unevenness characteristic and the backlight drive value, the second uncorrected unevenness characteristic being the uncorrected unevenness characteristic at a second gradation different from the first gradation; and generating correction data for each gradation for correcting an image signal, based on the first uncorrected unevenness characteristic, the second uncorrected unevenness characteristic, the first target unevenness characteristic, and the second target unevenness characteristic.

13. The image correction device according to claim 1, wherein the black level is selected between a settable maximum value of the black level and a settable minimum value of the black level.

14. The image correction device according to claim 1, wherein the second target unevenness characteristic calculation unit calculates the second target unevenness characteristic independent of the black level.

15. The image correction device according to claim 1, wherein the second target unevenness characteristic calculation unit calculates the second target unevenness characteristic independent of the correction amount.

16. The display device according to claim 11, wherein the black level is selected between a settable maximum value of the black level and a settable minimum value of the black level.

17. The display device according to claim 11, wherein the second target unevenness characteristic calculation unit calculates the second target unevenness characteristic independent of the black level.

18. The display device according to claim 11, wherein the second target unevenness characteristic calculation unit calculates the second target unevenness characteristic independent of the correction amount.

19. The image correction method according to claim 12, wherein the black level is selected between a settable maximum value of the black level and a settable minimum value of the black level.

20. The image correction method according to claim 12, wherein the second target unevenness characteristic calculation unit calculates the second target unevenness characteristic independent of the black level and the correction amount.

* * * * *